United States Patent [19]
Andrews et al.

[11] Patent Number: 4,548,795
[45] Date of Patent: Oct. 22, 1985

[54] TREATMENT OF ALUMINOUS MATERIALS

[75] Inventors: William H. Andrews, Mt. Waverly; David J. Milne, North Balwyn; Ronald W. Moyle, Templestowe; James P. Peters, Surrey Hills, all of Australia

[73] Assignee: Comalco Aluminum Limited, Australia

[21] Appl. No.: 608,806

[22] Filed: May 10, 1984

Related U.S. Application Data

[62] Division of Ser. No. 370,035, Apr. 20, 1982, Pat. No. 4,474,736.

[30] Foreign Application Priority Data

Apr. 29, 1981 [AU] Australia ............................... PE8629

[51] Int. Cl.$^4$ ............................................... C01F 7/22
[52] U.S. Cl. .................................... 423/126; 423/131; 423/111

[58] Field of Search ........................ 423/126, 131, 150

[56] References Cited

U.S. PATENT DOCUMENTS

| | | | |
|---|---|---|---|
| 1,519,648 | 12/1924 | Williams | 423/131 |
| 2,217,099 | 10/1940 | Burman | 423/126 |
| 2,947,604 | 8/1960 | Laist | 423/126 |
| 3,485,579 | 12/1969 | Vancil et al. | 423/126 |
| 4,224,287 | 9/1980 | Ziegenbalg et al. | 423/126 |

Primary Examiner—H. T. Carter
Attorney, Agent, or Firm—Larson and Taylor

[57] ABSTRACT

A leaching process employing acidic chloride solutions, whereby the iron content of aluminous materials such as lower grade iron-containing bauxite ores is reduced, enabling the obtention of valuable products such as metallurgical grade alumina and refractory grade bauxite, previously obtainable only from higher grade low-iron aluminous materials.

4 Claims, 3 Drawing Figures

Production of Metallurgical Grade Alumina

FIG. 1.

Production of Refractory Grade Bauxite

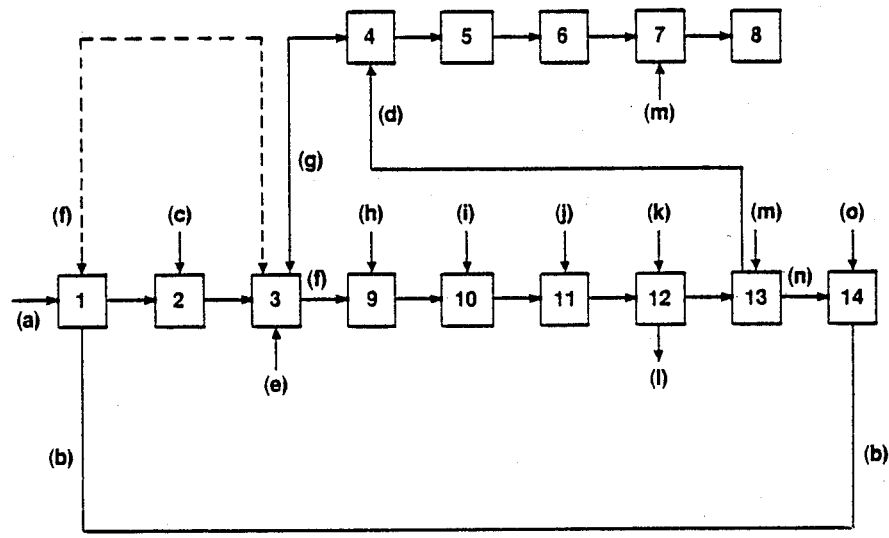

| | |
|---|---|
| 1. Leaching | (a) Dried, crushed, beneficiated bauxite feed |
| 2. Flocculation | (b) Hydrochloric acid solution |
| 3. Filtration and Washing | (c) Flocculation solution |
| 4. Blending | (d) Regeneration Oxides |
| 5. Drying | (e) Wash Water |
| 6. Briquetting | (f) Solution of recovered chlorides |
| 7. Calcination | (g) Filter Cake |
| 8. Product Storage | (h) Oxidation Agent |
| 9. Oxidation | (i) Crushed Bauxite |
| 10. Iron Precipitation | (j) Flocculant solution |
| 11. Flocculation | (k) Wash Water |
| 12. Filtration and Washing | (l) Filter cake to disposal |
| 13. Regeneration | (m) Fuel |
| 14. Absorption | (n) Hydrogen Chloride containing gases |
| | (o) Absorption Liquor |

Refractory Grade Bauxite Mass Balance

Production of Metallurgical Grade Alumina

TREATMENT OF ALUMINOUS MATERIALS

This is a division of application Ser. No. 370,035, filed Apr. 20, 1982, now U.S. Pat. No. 4,474,736.

This invention relates to treatment of aluminous materials. In a general aspect the invention relates to treatment of aluminous materials containing iron, for the purpose of reducing the iron content thereof.

Several aspects of the invention will be described in more detail hereunder.

All of these aspects achieve the production of valuable aluminous materials of low iron content, for example metallurgical grade alumina, from aluminous materials having unacceptably high iron content. In certain embodiments of the invention the aluminous materials of reduced iron content are further processed, for example to produce alumina based refractories. The invention also provides combination processes in which significant economies are achieved by recycling arrangements which will also be described in more detail below.

In one aspect the invention provides a process for the production of high alumina materials suitable for use in high temperature refractory applications from aluminous materials having iron contents normally regarded as too high for the production of refractories, the iron being present as oxide or as other compounds, which are at least partially soluble in acid. The aluminous materials to be treated are those wherein a high proportion of the combined aluminium is present typically as gibbsite, kaolin, or other compounds which are resistant to dissolution by hydrochloric acid and the titanium level is low enough for a refractory grade alumina material.

The term high alumina refractory materials in this context will be understood to include refractory grade calcined bauxite and other products principally composed of alumina or alumino-silicates for use in the refractory industry.

Alumina based refractories are normally produced from higher grade aluminous materials, which only require calcining, but not treatment for the removal of iron. Unfortunately deposits of such naturally occurring higher grade low iron bauxite ores which can be worked economically are restricted in distribution.

The invention enables lower grade iron-containing bauxite ores to be utilised for this purpose.

In addition to the advantage the process of the invention affords in its applicability to iron containing ores there is the further advantage that it yields what is virtually a synthetic product which may be of better quality than a natural product of generally similar composition because the control inherent in the process leads to greater consistency of the end product.

In a second aspect of the invention, uncalcined intermediate products derived from the abovementioned process may be used for the production of low iron alumina chemicals.

Known methods of iron removal include magnetic, flotation and gravity techniques. In some cases such physical methods may be used in conjunction with the process described herein to produce the desired product at minimum cost.

In a further aspect the invention provides a combined process including selective leaching of iron, a procedure for progressively enriching the alumina content of the final product in association with an acid recovery treatment from the leach liquid, and a processing sequence for producing alumina based refractory briquettes. The combined process leads to significant technical and economic gains.

According to a principal aspect of the invention, iron-containing aluminous material is subjected to a hydrochloric acid leach under conditions which preferentially dissolve iron while minimizing dissolution of alumina. In a preferred embodiment of this aspect of the invention, aluminous material or ore after beneficiation by physical methods, as appropriate, for example, washed bauxite, is recovered from a stockpile and crushed to a required sieve analysis. The ore then passes to feed bins from which it is discharged into a tank, there to be mixed with dilute hydrochloric acid solution, which may contain dissolved chlorides of iron and aluminium, to produce a slurry. The slurry so produced is caused to flow through one or more reactors wherein it is heated by direct or indirect means to an appropriate temperature, preferably in the range of 70° to 110° C., with the purpose of leaching a substantial proportion of the iron present in the ore whilst minimising the dissolution or extraction of alumina. After leaching the slurry may be flocculated and passed to a filter, preferably of the horizontal belt type, capable of being operated in a manner enabling counter-current washing to recover chloride values. The products of the filtering operation are a washed filter cake and a filtrate. The said filter cake is preferably blended with oxides produced during a subsequent acid re-generation stage and then dried to a controlled moisture level appropriate for briquetting. Finally the briquettes produced are calcined at an elevated temperature to yield alumina based refractory materials of high quality.

If necessary, the filtrate and washing from the above mentioned leaching step may be treated with chlorine gas to ensure that all of the iron is present in the ferric state.

The liquor so produced may be treated with fresh finely divided bauxite at an appropriate temperature, preferably 100° to 150° C., while being passed through one or more reactors. During this stage a substantial proportion of the iron chloride is converted to iron oxide or iron hydroxide with associated formation of aluminium chloride; at the same time, aluminium chloride in solution reacts with further alumina in the bauxite, forming a complex aluminium hydroxychloride, variously known as aluminium chlorhydroxides and basic aluminium chlorides.

At the completion of the stage, the slurry is reduced in temperature to less than 100° C., flocculated with an appropriate reagent, filtered and washed on a horizontal belt filter to recover chlorides.

The filter cake is a mixture of unreacted components of the bauxite and precipitated iron oxide/hydroxide. This mixture is commonly regarded as a waste product.

In the accompanying drawings:

FIG. 1 is a flow sheet illustrating the process described above.

Figure 2:
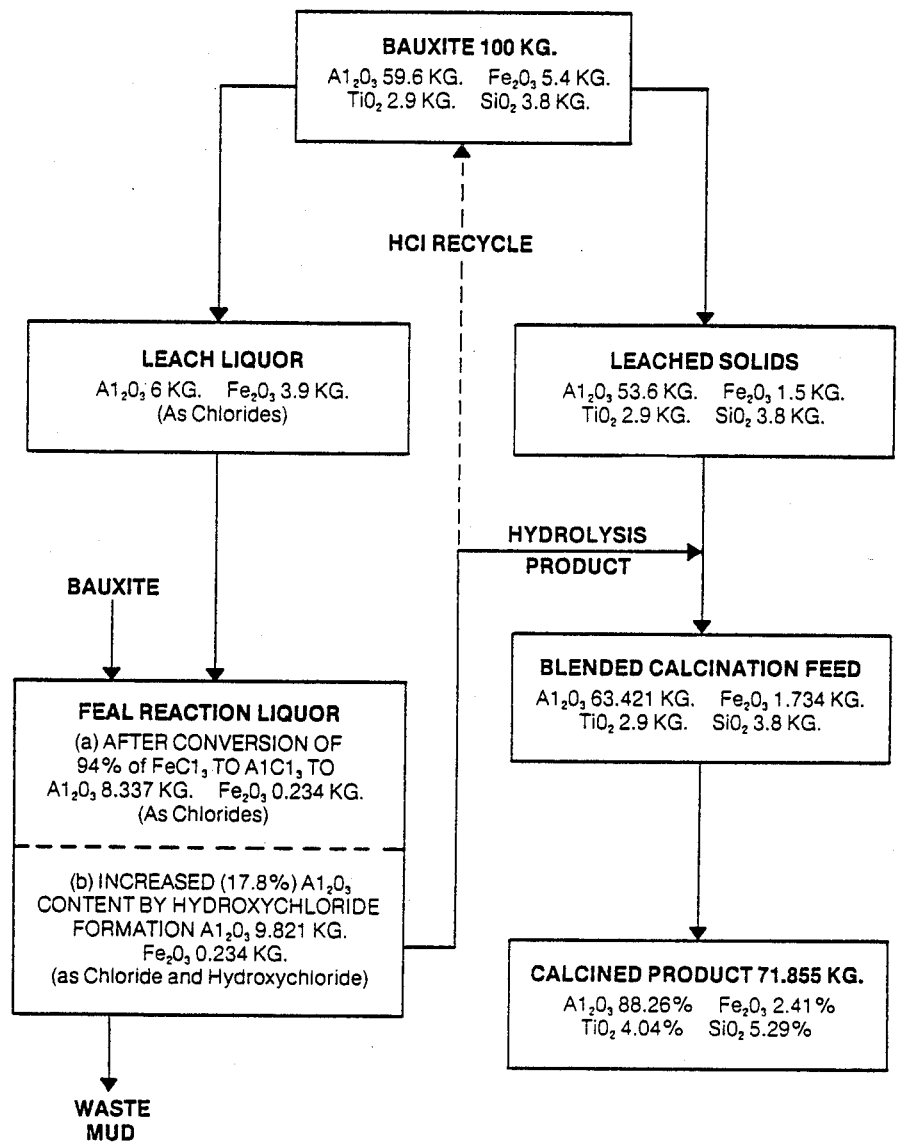
FIG. 2 illustrates Examples 1 and 2 below.

In the course of research resulting in development of the abovementioned technique for enriching the alumina content of a refractory product we have found that solutions of aluminium chloride at elevated temperatures are capable of dissolving alumina from bauxite with variable degrees of attack upon other components of the bauxite. The resultant solutions can be treated to recover solid aluminium compounds which if sufficiently pure may be directly calcined to metallurgical grade alumina, or if impurities are present may be further processed for purification prior to calcination. In this aspect the present invention has potential beyond the refractory area.

Thus in a particular embodiment of this aspect of the invention we have found that bauxite ore ground to pass 0.3 mm, typically, when reacted with 20 to 30 wt. percent aqueous aluminium chloride solution, which may contain significant concentrations of recycled metal chlorides, principally ferric chloride, at temperatures in the range 120° to 200° C. for a duration of ½ to 4 hours and in the proportion of between 22 and 7 of solution to 1 of bauxite by weight, undergoes the extraction of up to 80 percent by weight of the total alumina. At the same time, iron oxide, usually present as hematite, will be extracted to the extent of approximately 80 percent by weight, while extraction of silica and titania is limited to less than 10 percent by weight. The resulting solution of basic aluminium chloride containing ferric chloride and minor concentrations of silica, titania, and oxides or chlorides of calcium, phosphorus and vanadium, may be evaporated to yield crystals of basic aluminium chloride hydrate. By controlled agitation for between 24 and 48 hours the crystals will be formed into a size suitable for rapid filtration by conventional means and the mother liquid recovered. After washing with a suitable solvent in which they are sparingly soluble, such as ethanol, the crystals may be calcined to alumina of high purity and the chloride component of the crystals recycled as hydrochloric acid solution to reform the original aqueous aluminium chloride solution required for digestion of bauxite.

Adjustment of the solution concentration and removal of impurities such as iron, silica and titanium will be necessary, such adjustment being well within the competence of persons skilled in the art.

We shall now proceed to describe in more detail another aspect of the invention which provides an improved process for production of refractory grade calcined bauxite from iron-containing aluminous material.

In a further preferred embodiment of this aspect of the invention a suitably beneficiated bauxite is dried to a moisture level compatible with the crushing operation, typically 6% free moisture, and crushed to a suitable size, for example a maximum particle size of not more than 1 mm. The leaching reaction may be initiated by mixing the crushed mixture with pre-heated acid or a pre-heated solution containing both acid and metal chlorides, or by heating the bauxite-acid slurry at a temperature preferably in excess of 70° C. in a first reaction vessel or reactor. The relative proportions of bauxite and acid selected will depend on the initial $Fe_2O_3$ level of the ore being treated and the reactivity of the alumina in the bauxite.

The reactions below are thought to represent the overall reactions taking place at this stage of the process. The quantity of iron reacting according to equation 2 is regarded as the amount which is necessary to reduce the iron oxide level to that desired in the end product, while the alumina reacting according to equation 1 is the amount taken into solution concomitantly with the achievement of this level.

$$Al_2O_3 + 6HCl \rightarrow 2\ AlCl_3 + 3H_2O \qquad (1)$$

$$Fe_2O_3 + 6HCl \rightarrow 2\ FeCl_3 + 3H_2O \qquad (2)$$

Typically, it has been found that for a bauxite containing about 6% $Fe_2O_3$ it is desirable to dissolve 75 to 85% of the iron in the bauxite and to achieve this level between 8 and 12% of the total alumina present is dissolved.

In practice it has been found useful to base the acid requirement upon 80% dissolution of the iron and 8% of the alumina.

The use of 105% of the level corresponding to the above degrees of dissolution results in a final acid concentration in the liquor after leaching of about 1% free acid.

This level should not exceed 120% to maintain acceptable free acid levels in later stages of treatment.

When using a reaction temperature of 80° to 90° C. the contact time between acid and bauxite may be, typically, 20-40 minutes, but may be shorter or longer depending upon a number of variables, such as grind of bauxite, initial $Fe_2O_3$ level, amount of excess acid, acid concentration, chloride concentration and the temperature of reaction. The concentration of acid found to be most appropriate is about 20% although more dilute or stronger acid may be used, but with an ensuing cost penalty in the later acid regeneration step.

If more than one reaction vessel is used the vessels should be chosen to approach a condition of true plug flow, thereby minimising short circuiting of the reaction components and producing the required free acid concentration in the final leached slurry.

Flocculation of the leached slurry is required to aid solids-liquid separation, the required addition rate of flocculants, used as a dilute aqueous solution, being dependent upon the chloride level in the leached liquor. At chloride levels of about 17% the flocculant addition may be as low as 250 ppm but it increases rapidly at higher chloride levels. The preferred flocculant is a non-ionic polyacrylamide.

Filtration of the flocculated slurry is preferably carried out on a horizontal belt filter. It is rapid at low levels of vacuum under which conditions the open structure of the flocculated solids is maintained, thus aiding subsequent washing. Counter-current washing is carried out on the filter to recover chloride values while minimising the amount of wash water used since it is desirable to maintain high liquor strengths in the combined filtrate and washings to permit regeneration without excessive evaporation loads. A limiting factor for chloride recovery is the quantity of residual soluble iron chloride in the filter cake, since this will affect final product quality. A typical maximum chloride concentration in the cake liquor would be 0.5%.

A portion of the filtrate may be re-cycled to the leaching reaction to increase the total chloride content of the leaching medium as this may assist iron selectivity during leaching and the actual rate of leaching with some raw materials. The residual filtrate may be treated with an oxidant, such as gaseous chloride, to convert ferrous to ferric ions prior to subsequent process stages in which it is essential to have the iron in a fully oxidised form.

From published information it is known that the treatment of ferric chloride solutions with metakaolin-produced by heating kaolin to a temperature of at least 550° C.-causes the precipitation of ferric oxide with the associated formation of aluminium chloride. In the course of our work, it was shown that a similar reaction was obtained by using a gibbsitic bauxite activated by calcination at temperatures of about 300° to 500° C. but, unexpectedly, it was also shown that bauxite in the ground, but *uncalcined* state was able to be substituted for heat treated kaolin or activated bauxite. In all cases the chemical reactions taking place involve complex ions, but may be represented in the following general manner:

$$2FeCl_3 + Al_2O_3 \rightarrow Fe_2O_3 + 2AlCl_3 \quad (3)$$

A substantial excess of the alumina bearing solid material must be used and this may amount up to four times the stoichiometric level. Reaction (3) is caused to proceed until the residual iron in solution is at a level acceptable for subsequent treatments. This process stage is carried out in one or more reactors and typically involves a retention time of one to four hours at a temperature within the range of 100° to 150° C.

For ease of reference the reaction (3) has been termed the FeAl reaction, as it is based upon an exchange of iron (Fe) and aluminium (Al) cations.

Unexpectedly, it has also been shown that concurrently with equation 3, what is believed to be a further beneficial reaction takes place, namely, aluminium chloride in solution reacting with alumina from the bauxite or clay to produce complex aluminium hydroxychlorides of the formula $$Al_2(OH)_n Cl_{(6-n)}$$

according to the following reaction $$x\, Al_2Cl_6 + y\, Al_2(OH)_6 \rightarrow Al_{2(x+y)} (OH)_{6y} Cl_{6x} \quad (4)$$

These two equations (3) and (4), are of great importance and economic value in increasing the dissolved alumina content of the treated liquor, while at the same time the dissolved iron content is decreased. We have found that after flocculation, filtration and washing of the waste product, chloride rich liquors can be produced which are suitable for hydrolysis at elevated temperatures using well known processes developed for the regeneration of acid pickle liquors in the steel industry. This hydrolysis is carried out by introducing the liquor into a reaction chamber into which are also fed the combustion products obtained by burning fuels, preferably, liquid or gaseous. The reaction temperature required to obtain complete hydrolysis may be of the order of 800° C. and the reactions which take place are believed to be:

$$2\, AlCl_3 + 3H_2O \rightarrow Al_2O_3 + 6HCl \quad (5)$$

$$2\, Fe_2Cl_3 + 3H_2O \rightarrow Fe_2O_3 + 6HCl \quad (6)$$

$$Al_2(OH)_n Cl_{(6-n)} \rightarrow Al_2O_3 + (6-n)\, HCl + (n-3)\, H_2O \quad (7)$$

The solid and gas phases are separated in cyclones and/or electrostatic precipitators. The gas stream which primarily contains hydrogen chloride and the products of combustion is contacted directly with incoming chloride solution to obtain a more concentrated solution as reactor feed. At the same time the gas stream is cooled to about 100° C. The gases are then contacted with water or an aqueous chloride stream in a counter-current absorption tower to produce acid of up to 20% HCl concentration.

Effluent gas streams are scrubbed with alkali to reduce the residual hydrogen chloride to an acceptable level prior to the exhaust gases being discharged to atmosphere. The oxides from regeneration normally containing in excess of 95% $Al_2O_3$ and less than 2.5% $Fe_2O_3$ by weight are recovered and blended with the leached aluminous ore prior to briquetting and calcination. These oxides both increase the quantity of the final product and improve the grade because of their high $Al_2O_3$ content.

The filter cake obtained from separation and washing of the leaching solids is blended with the regenerated oxides and then dried to approximately 10% free moisture. The exact level is adjusted to suit use of a roll press briquetting machine for producing briquettes of sufficient mechanical strength to resist degradation during subsequent mechanical handling and calcining. The product from the briquetting press should preferably be screened to recover small fragments for return to the blending operation. The briquettes should preferably be dried to a low free moisture content before calcination to minimise the production of fines within the kiln. Calcination at elevated temperatures in the range 1600° to 1750° C. is required to produce a dense, chemically inert and highly refractory material suitable for the manufacture of high alumina products. The end product can be of controlled particle size by selection of appropriate briquette mould dimensions, thus permitting the sale of a material which can be crushed by the end user to produce the optimum range of particle sizes for this application. The material may also be produced in physical forms other than briquettes.

It has been demonstrated that by the process of this invention it is possible to produce a form of calcined bauxite containing more than 80% $Al_2O_3$, dependent upon the initial feed stock, which has good refractory characteristics generally comparable with high grade material presently produced from suitable naturally occurring bauxites.

In order to utilise the chemistry of the FeAl reaction above to prepare alumina for electrothermal reduction to aluminium metal, bauxite ore is ground and reacted with aqueous aluminium chloride solution at temperatures above 150° C. While it has been found that 50% of the total alumina may be extracted from bauxite by reflux with 30 wt percent aqueous aluminium chloride solution for 4 hours at atmospheric pressure, more rigorous conditions of temperature and pressure are required to improve the degree of extraction and decrease the reaction time. The reaction conditions are limited to about 240° C. at which temperature deposition of basic chloride or hydrated alumina compounds can occur.

Figure 3:
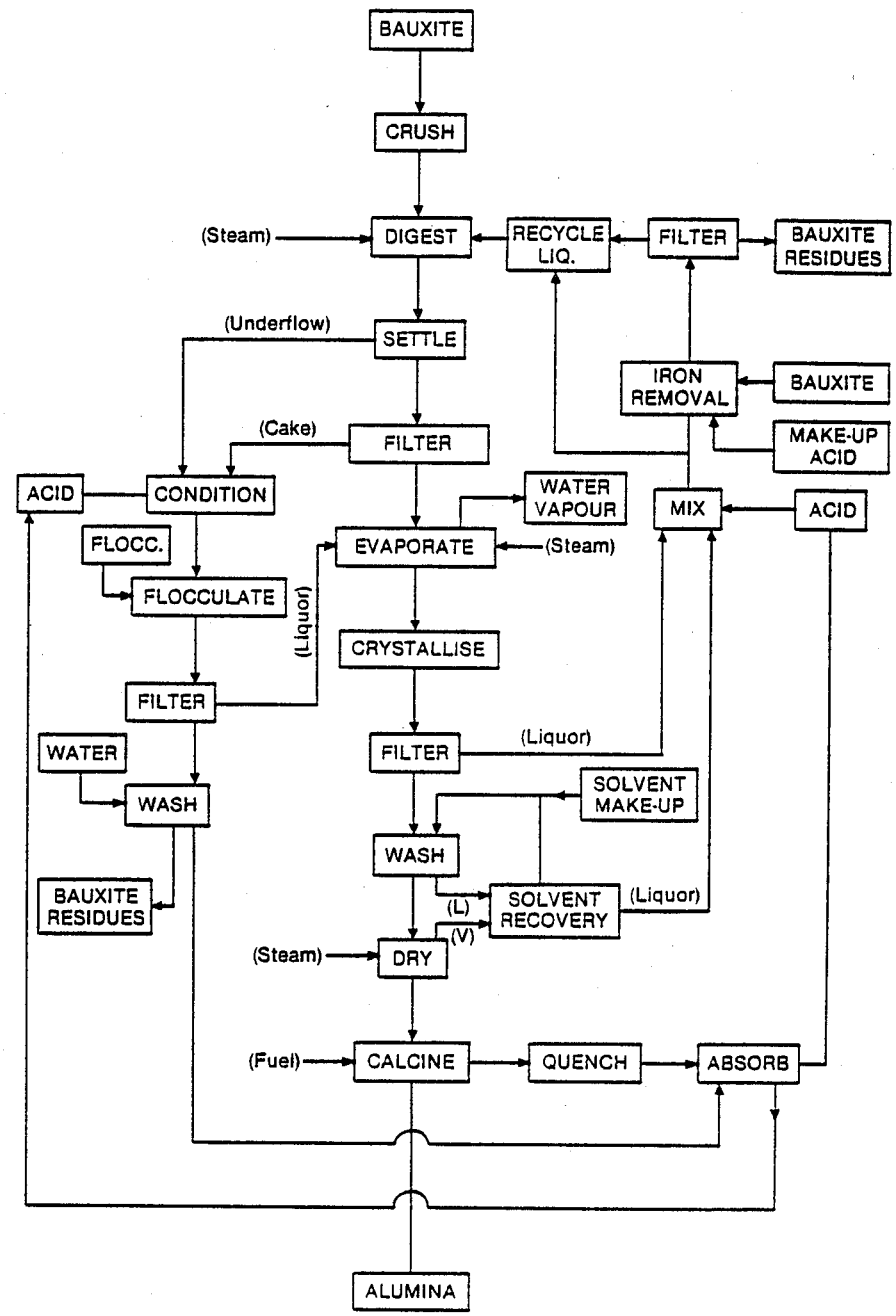
FIG. 3 illustrates a process for production of metallurgical grade alumina according to the invention which will be described below.

Following the reaction between bauxite and aluminium chloride, the unreacted solids may be separated and washed by the processes of settling, filtration and flocculation illustrated in FIG. 3. The purpose of the separation is to recover chloride values for recycle to the reaction step to minimise loss of reagent, without excessive dilution.

While recovery of crystal basic aluminium chloride hydrate or hydrated alumina from aqueous basic chloride solutions may be accomplished by heating the solution for a time duration dependent on initial composition and temperature, the preferred method is by evaporation.

It has been found that provided the initial extraction solution is sufficiently concentrated, the degree of evaporation required is of the order of 5 to 15% in order to recover from solution the alumina extracted from bauxite in the initial digestion step. By suitable agitation during cooling of the evaporated solution, the resulting crystals are readily separated from the mother liquor by vacuum filtration and further purified to remove chloride by washing with a suitable solvent. As the crystals are very soluble in water, an aqueous wash medium is not desirable. Return of the mother liquor from the above filtration step and from crystal washing are necessary to maintain high chloride levels in the reaction solution.

The crystals formed by evaporation when separated and washed as above may approach 40 wt percent alumina. They are a mixture of normal aluminium chloride hexahydrate and basic aluminium chloride hydrates. Some identification of the individual species in the complex mixture is possible by X-Ray diffraction, revealing that the basic chloride 5 $AlCl_3$. 8Al $(OH)_3$.37.5 $H_2O$ is a common component, but other basic chlorides such as $AlCl_3$.4 $Al(OH)_3$.7 $H_2O$, $AlCl_3$. 2 $Al(OH)_3$.6 $H_2O$ are possible and it is further deduced that a hydrate $5AlCl_3$. 8 $Al(OH)_3$. $6H_2O$ is present.

Temperatures in excess of 800° C. are necessary to remove all traces of chloride from the basic chloride hydrate crystals and to complete the $\alpha Al_2O_3$ transition. Provided that the crystals have been adequately washed, iron oxide levels in the calcined alumina product will not exceed 0.03 wt percent while the minor oxide levels may be held to low values, for example, $TiO_2$ less than 0.002 wt percent, $V_2O_5$ less than 0.001 wt percent. Concurrent with formation of alumina, chloride is recovered from the calcination step as hydrogen chloride, for example:

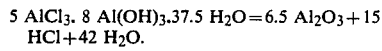

Allowing for quenching of the hot gases from a single stage direct heated calcination at up to 1100° C., the gas composition is suitable for absorption to form dilute hydrochloric acid. The acid strength may be adjusted up to a maximum of 20 wt percent for direct contact adiabatic absorption to balance with the net removal of water in the evaporation step. By combining the dilute hydrochloric acid thus recovered from calcination with the crystal mother liquor recycled from evaporation and crystal washing, a liquor of composition similar to that used in the initial bauxite digestion step is recovered. The liquor contains excessive quantities of iron chloride together with traces of titanium, silica, calcium, vanadium and other metal compounds.

Iron is removed from the recovered digest liquor in a similar manner to that used to remove iron from the liquor obtained when bauxite is reacted with hydrochloric acid. That is, by contact with fresh bauxite under controlled conditions of total chloride level and free acidity. Further processing to remove minor elements, such as titanium, silica and vanadium will be determined by the degree to which these elements are present in the initial bauxite, their rate of extraction and the degree to which they are absorbed on to the reject solid streams.

By this method, a metallurgical grade alumina may be extracted from bauxite, particularly those ores containing high silica where alumina is present as the trihydrate mineral gibbsite.

EXAMPLE 1

Acid Leaching

A sample of bauxite ore was crushed to pass 0.6 mm, with 20% passing 0.075 mm. The ore was dried at 105° C. and 614 g reacted with 628 g of 19.9% hydrochloric acid for 30 minutes in a 1.5 litre beaker. Overhead stirring was used to provide mixing with a 40 mm dia. 2-bladed impeller at 180 rpm. The acid was heated to 75° C. to initiate the reaction after which the temperature was maintained at 85°–80° C. by a water bath. 160 ml of 0.1% flocculant (Cyanamid N100S) in 13.4% chloride solution was added after 20 minutes and the reacted slurry filtered and washed in a 13.5 cm ID vacuum filter at $-20$ kPa using a polypropylene monofilament filter cloth. Filtration and washing were rapid, yielding a clean, cohesive cake, which was dried for estimation of yield, and assayed.

|  | Wt. | $Al_2O_3$ | $SiO_2$ | Quartz | $Fe_2O_3$ | $TiO_2$ | L.O.I. |
|---|---|---|---|---|---|---|---|
| Feed Ore | 100 | 59.6 | 3.8 | 1.3 | 5.4 | 2.9 | 28.3 |
| Leached Solids | 87.3 | 61.4 | 4.3 | 1.7 | 1.7 | 3.4 | 29.0 |

For the above assays and weight yield it may be calculated that 10.1% of the alumina and 72.6% of the iron oxide were extracted. The leached solids would calcine to approximately 2.4% $Fe_2O_3$ and 86.5% $Al_2O_3$.

Prior to adding floc, the calculated liquor composition was

| $AlCl_3$ | 14.5% W/W |
|---|---|
| $FeCl_3$ | 7.4% W/W |
| HCl | 2.3% W/W |

EXAMPLE 2

FeAl Reaction Using Actual Leach Liquors

A spent leach liquor was prepared by leaching Bauxite with 20% hydrochloric acid generally according to the conditions previously specified for the leaching step. The filter cake was washed with an appropriate amount of water to recover essentially all of the chloride values. The final filtrate and washings had a nominal composition of (by weight): $FeCl_3$, 4.1%; $AlCl_3$, 7.9%; HCl, 0.4%.

300 g of the above leach liquor were reacted with 29.8 g of fresh, finely divided bauxite at 105° C. The bauxite had an initial composition of: $Al_2O_3$, 59.8%; $Fe_2O_3$, 6.8%; $SiO_2$, 3.0%; $TiO_2$, 2.5%.

Loss on ignition: 27.7%.

The reaction was carried out under reflux in a 700 ml glass vessel for 4 hours. At the termination of the reaction period 300 ppm of nonionic flocculant was added and the contents of the vessel were filtered while hot. The solid residue and the resultant liquor had the following compositions by weight:

Solid: $Al_2O_3$, 45.2%; $Fe_2O_3$, 25.1%; $SiO_2$, 2.9%; $TiO_2$, 2.7%.

Loss on ignition: 23.9%.

Liquor: $Fe^{3+}$, 0.073%; $Al^{3+}$, 2.70%; $Cl^-$ 9.6%.

The amount of iron removed from the original liquor was 94.0%. The final liquor composition was such that hydrolysis in a commercial reactor would result in the following solid composition: $Fe_2O_3$, 2.0%; $Al_2O_3$, 98.0%.

Calculation of the expected $Al+++$ content of the liquor allowing for the 94% conversion of $FeCl_3$ to $AlCl_3$ in the reaction with bauxite gives a result of 2.29% $Al+++$, whereas the experimental value was 2.70%, which is 117.8% of the expected value. This increase is associated with the formation of an aluminium hydroxychloride complex, resulting from reaction between aluminium chloride in solution and bauxite unreacted during the conversion of the ferric chloride to aluminium chloride.

The examples above relate to the separate operations of initial leaching and to the FeAl reaction. Typically in a continuous circuit including both operations in the appropriate sequence, the final products would be combined prior to final agglomeration and calcination.

FIG. 2 based on the results of Examples 1 and 2, represents the complete circuit in a simplified form.

The benefits of the additional processing are apparent in the calculated analyses of the products from the initial leach solids and the final blended feed to calcination.

|  | Leached Solid (Calcined) | Blended Calcination Feed (Calcined) |
|---|---|---|
| $Al_2O_3$ | 86.73 | 88.26 |
| $Fe_2O_3$ | 2.43 | 2.41 |
| $TiO_2$ | 4.69 | 4.04 |
| $SiO_2$ | 6.15 | 5.29 |

EXAMPLE 3

Extraction of Alumina From Bauxite

A reaction between 79.9 g of crushed bauxite and 1003.4 g of 25% W/W aluminium chloride solution was carried out at a reflux temperature of 114° C. for 4 hours. The bauxite had previously been crushed to pass 0.6 mm and dried, and was assayed at 59.4% $Al_2O_3$, 4.6% $SiO_2$, 6.1% $Fe_2O_3$, 2.5% $TiO_2$ and 27.2% L.O.I.

After cooling, the unreacted solids were recovered by filtration and the dry weight determined as 46.5 g. The assay for the solids was 59.6% $Al_2O_3$, 7.7% $SiO_2$, 4.4% $Fe_2O_3$, 4.2% $TiO_2$ and 24.0% L.O.I., indicating that 41.6% of the alumina and 59% of the iron oxide had been extracted while silica and titania were not dissolved. Calculation of the mineralogical phases present indicated that gibbsite was the only alumina bearing mineral substantially attacked. Of the total gibbsite present 55% was extracted.

A portion of the undiluted liquor from the above extraction was concentrated by evaporation to about 73% on a weight basis. A white precipitate was formed which on calcination at 1150° C. yielded a white powder shown by X Ray Diffraction to be high purity $\alpha$-$Al_2O_3$ basically suitable for metallurgical purposes. The precipitate on heating also yielded water and hydrogen chloride and the calculated composition was $Al_2(OH)_2Cl_4 \cdot 12H_2O$.

EXAMPLE 4

Alumina extraction from bauxite with aluminium chloride solution

Using a high silica, high iron bauxite of composition $Al_2O_3$ 54.7 wt percent, $SiO_2$ 8.5 wt percent, $Fe_2O_3$ 9.1 wt percent, $TiO_2$ 2.4 wt percent and 25.1 wt percent loss on ignition, ground to pass 0.3 mm, a reaction was carried out in a 180 ml titanium metal bomb at 150° C. for 30 min.

The bomb being directly heated by a gas flame, with heat input rate controlled by vessel temperature, heat up time of 2-3 minutes was obtained.

At the end of the required reaction time the bomb was removed from the rotation device and quenched in a large volume of cold water. Temperature control was within 1° C. during the course of the reaction.

With 20 wt percent aluminium chloride solution in the ratio 17.5 solution to 1 bauxite, the resulting extractions were $Al_2O_3$ 68 wt percent, $Fe_2O_3$ 83 wt percent, $SiO_2$ 7 wt percent, while no titanium dioxide extraction was observed.

From calculated mineralogy, supported by X-Ray diffraction studies, it was apparent that at these conditions, extraction of alumina in the trihydrate form, gibbsite was almost complete, while the extraction of the monohydrate boehmite was low.

EXAMPLE 5

Recovery of Alumina

To evaluate aspects of the recovery of alumina from the products of digestion of bauxite in aluminium chloride solution, synthetic solutions were prepared from reagent grade aluminium chloride hexahydrate, alumina trihydrate and ferric chloride hexahydrate.

A solution of $Al_2O_3$ 17.6 wt percent, chloride ion 23.6 wt percent and $Fe_2O_3$ 1.0 wt percent was prepared, corresponding to the extraction of bauxite with 30 wt percent $AlCl_3$ solution. Evaporation of approximately 200 g of this solution on a boiling water bath while stirring, resulted in the evaporation of 12.6 percent of the initial weight of the solution in 30 minutes. It had previously been established that no loss of chloride ion occurs during evaporation. Gentle stirring was continued for a further 20 hours.

The fine crystals which had formed as a result of this evaporation and crystallisation were easily separated from the cold, viscous mother liquor by vacuum filtration. The yield of 46 g of these crystals which had been washed with 225 ml of Ethanol, were analysed at 34.1 wt percent $Al_2O_3$, 29.4 wt percent $Cl^-$ and 0.3 wt percent $Fe_2O_3$.

The recovery of alumina was established to be 112 wt percent of the 'basic' $Al_2O_3$ component of the initial solution. Calcination of these crystals at 1100° C. resulted in an alumina containing less than 0.01 wt percent $Fe_2O_3$, the low iron content resulting from volatilisation of most of the iron as chloride.

We claim:

1. Process for treatment of aluminous material containing iron and where the object aluminous mineral is gibbsite, to reduce the iron content thereof and to produce metallurgical grade alumina, which comprises the steps:-
    (a) reacting crushed bauxite having a maximum particle size of about 1 mm with from 22 to 7 parts of an aqueous aluminium chloride solution containing up to 30 weight percent $AlCl_3$ to one part of bauxite by weight, at a temperature in the range 120° C.-240° C., whereby aluminium hydroxide and iron minerals are extracted;
    (b) filtering the product of step (a) to separate a solution containing aluminium hydroxychlorides from a gangue material which latter is discarded;

(c) evaporating and crystallising the solution from step (b) to produce crystalline aluminium hydroxychlorides;

(d) filtering the product of step (c) to separate a solution containing unreacted aluminium chloride and uncrystallised aluminium hydroxychlorides, from crystalline aluminium hydroxychlorides;

(e) washing the crystalline aluminium hydroxychlorides from step (d) with a water miscible liquid in which the crystalline aluminium hydroxychlorides are insoluble or soluble only to a limited extent, to remove salts of iron and other contaminating materials; and (f) calcining the crystalline product from step (e) at a temperature in the range 800° to 1100° C. to produce metallurgical grade alumina and gaseous hydrochloric acid.

2. Process according to claim 1 wherein the hydrochloric acid from step (f) is reacted with residual aluminium hydroxychlorides contained in the filtered solution from step (d) to form aluminium chloride and the resultant solution recycled to step (a).

3. Process according to claim 2 wherein the combined liquor is reacted with fresh crushed bauxite in order to remove iron therefrom prior to returning said liquor to step (a).

4. Process according to claim 3 wherein the reaction with fresh crushed bauxite is carried out at a temperature in the range 100° C. and the product of the reaction is subjected to filtration at a temperature below 100° C.

* * * * *